No. 12,126. REISSUED JUNE 23, 1903.

S. E. DUFF.

RAILWAY CONSTRUCTION.

APPLICATION FILED DEC. 15, 1902.

WITNESSES

Warren W. Swartz

H. M. Corwin

INVENTOR

Samuel E. Duff by his Attorneys

Baxewell & Byrne

No. 12,126. Reissued June 23, 1903.

UNITED STATES PATENT OFFICE.

SAMUEL E. DUFF, OF BELLEVUE, PENNSYLVANIA.

RAILWAY CONSTRUCTION.

SPECIFICATION forming part of Reissued Letters Patent No. 12,126, dated June 23, 1903.

Original No. 672,892, dated April 30, 1901. Application for reissue filed December 15, 1902. Serial No. 135,340.

*To all whom it may concern:*

Be it known that I, SAMUEL E. DUFF, of Bellevue, in the county of Allegheny and State of Pennsylvania, have invented a new and useful Improvement in Railway Construction, of which the following is a full, clear, and exact description, reference being had to the accompanying drawings, forming part of this specification, in which—

Figure 1:
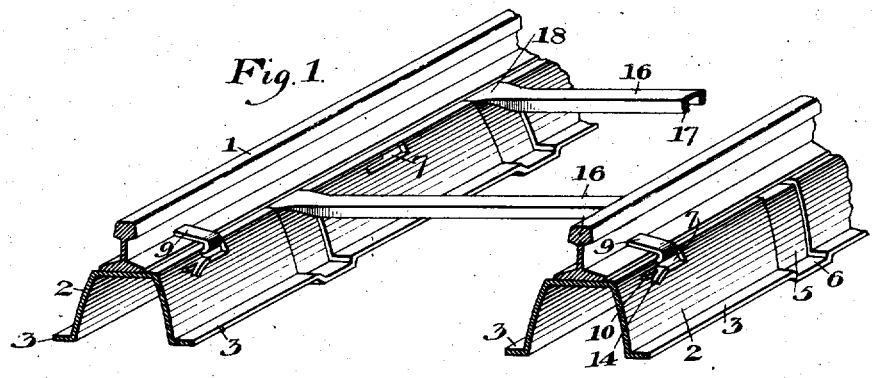
Figure 2:
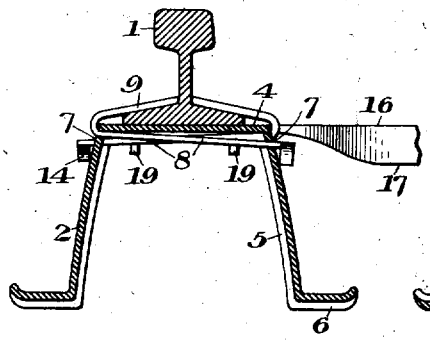
Figure 3:
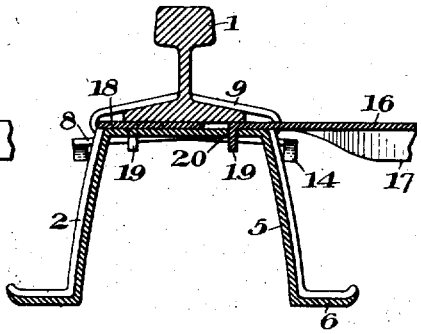
Figure 4:
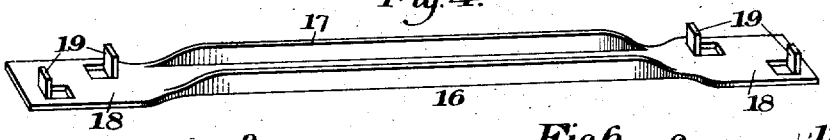
Figure 5:
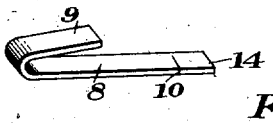
Figure 6:
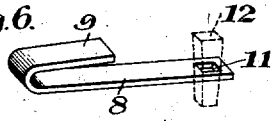
Figure 7:
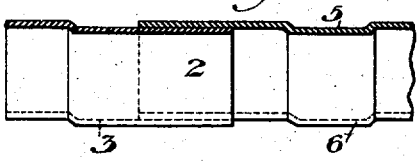

Figure 1 is a perspective view of a section of track constructed in accordance with my invention. Fig. 2 is a vertical section transversely of one of the girders. Fig. 3 is a similar section taken through the tie-piece. Fig. 4 is a perspective view of the tie-piece. Figs. 5 and 6 are perspective views showing different types of clips, and Fig. 7 is a longitudinal vertical section showing a slip-joint between the ends of the girders.

My invention relates to substructure of railways, and is designed to provide a continuous-girder construction which may be easily and cheaply made and installed and which will give an efficient and durable structure.

In the drawings, 2 represents the girders, having flat upper faces 4, upon which the rails 1 are supported. The sides of the girders are preferably slightly convex and terminate in bottom flanges 3, which extend outwardly and are preferably turned up slightly at their edges to increase the strength. The girders are provided in their tops and sides with recesses or depressions 5, which are also extended through the bottom flanges, as shown at 6. These depressed portions are of a suitable width and depth to receive the flattened ends 18 of the channel side piece 16, having the flanges 17. The flattened portions 18 are provided with struck-up lugs 19, which engage slots 20, cut in the tops of the girders.

The rails are held in place by clips 8, having hooked ends 9, these clips being inserted through slots in the sides of the girders and held in place either by a cut lug 14, which is bent down, as shown in Figs. 1 to 4, or by a key 12, driven through a hole in the end, as shown in Fig. 6.

The ends of the girders in each continuous row are preferably connected by slip-joints, which allow expansion and give a continuous and firm support to the rail and transmit the load uniformly to the road-bed in all positions of the load. This is illustrated in Fig. 7, wherein the end of the left-hand girder is contracted and slips within the end of the girder at the right hand of the figure.

The advantages of my invention result from the simplicity, cheapness, and ease of construction in assembling the parts. A continuous support for the rails is afforded, the springing of the rail ends is prevented, and the ballast can be easily and cheaply applied.

Many variations may be made in the form and arrangement of the parts without departing from my invention, since

I claim—

1. In railway construction, a supporting substructure comprising continuous-girder sections underneath the rails, and carried on suitable ballasts or ground-support, said girder-sections having interfitting slip-joints between their ends; substantially as described.

2. In railway construction, a continuous girder composed of girder-sections with the end of one section reduced in size and fitting within the next section; substantially as described.

3. In railway substructures, a continuous girder having transverse depressions, and provided with flanges having registering depressions; substantially as described.

4. In railway substructures, two lines of continuous girders of inverted-trough shape arranged to receive the rails on their upper face and having channel-shaped tie-pieces connecting the girders; substantially as described.

5. In railway substructures, a longitudinal girder having slots in its sides and oppositely-extending clips having their shanks extending through said slots; substantially as described.

6. In railway substructures, a pair of continuous girders having transverse depressions, tie-pieces extending transversely and seated within the depressed portions, said girders having side slots and transverse clips extending through said slots; substantially as described.

7. In railway substructures, a pair of continuous girders having transverse depressions, transverse tie-pieces having their ends resting in the depressed portions, and a lugand-slot connection between said ends and the girder; substantially as described.

8. In railway construction, a longitudinal girder-section, having bottom lateral flanges and transverse depressed portions extending through the tops, sides and flanges, and a tie-piece resting in the top depression and secured to the girder; substantially as described.

9. In a support for railway-rails, the combination of girders having converging side walls, an outwardly-extending portion, connecting-piece, said girders having formed therein recesses and openings, tie-pieces of channel construction carrying flat ends and lugs, said lugs adapted to engage said openings in the girders, clips encircling the base portion of the rail, and the upper portion of said girders, said clips having their ends bent downwardly when placed in proper position forming a lock, all parts being constructed and operating substantially as herein shown and described.

In testimony whereof I have hereunto set my hand.

SAMUEL E. DUFF.

Witnesses:
H. M. CORWIN,
L. M. REDMAN.